US012761500B2

(12) United States Patent
Giraudet

(10) Patent No.: US 12,761,500 B2
(45) Date of Patent: Oct. 13, 2026

(54) LENS ELEMENT

(71) Applicant: Essilor International, Charenton-le-Pont (FR)

(72) Inventor: Guillaume Giraudet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 330 days.

(21) Appl. No.: 18/571,345

(22) PCT Filed: Jun. 29, 2022

(86) PCT No.: PCT/EP2022/067979

§ 371 (c)(1),
(2) Date: Dec. 18, 2023

(87) PCT Pub. No.: WO2023/275189

PCT Pub. Date: Jan. 5, 2023

(65) Prior Publication Data

US 2024/0280832 A1 Aug. 22, 2024

(30) Foreign Application Priority Data

Jun. 30, 2021 (EP) .................................... 21182929

(51) Int. Cl.
*G02C 7/02* (2006.01)

(52) U.S. Cl.
CPC ......... *G02C 7/022* (2013.01); *G02C 2202/24* (2013.01)

(58) Field of Classification Search
CPC ..... G02C 7/022; G02C 7/027; G02C 2202/24
USPC ............................... 351/158, 159.01, 159.73
See application file for complete search history.

(56) References Cited

U.S. PATENT DOCUMENTS 10,268,050 B2 * 4/2019 To ............................ G02C 7/06
10,948,744 B1 3/2021 Guillot et al.
10,962,804 B1 3/2021 Guillot et al.
12,504,647 B2 * 12/2025 Cho ....................... G02C 7/027
2017/0131567 A1 * 5/2017 To ............................ G02C 7/06
(Continued)

FOREIGN PATENT DOCUMENTS

CN 109633925 A 4/2019
CN 110687689 A 1/2020
(Continued)

OTHER PUBLICATIONS

International Search Report & Written Opinion issued Sep. 23, 2022 in PCT/EP2022/067979, filed on Jun. 29, 2022, 14 pages.
(Continued)

*Primary Examiner* — Bumsuk Won
*Assistant Examiner* — Seth D Moser
(74) *Attorney, Agent, or Firm* — Oblon, McClelland, Maier & Neustadt, L.L.P.

(57) ABSTRACT

A lens element adapted to a wearer and intended to be worn in front of an eye of the wearer, the lens element comprising:—a refraction area having a refractive power based on a prescribed refractive power Px for 5 said eye of the wearer and comprising at least a central zone,—a plurality of optical elements having an optical function of not focusing an image on the retina of the eye of the wearer, wherein the optical elements are organized based at least on the prescribed refractive power Px and the functional asymmetries over the visual field of the wearer.

19 Claims, 3 Drawing Sheets

(56) References Cited

U.S. PATENT DOCUMENTS

| | | | | |
|---|---|---|---|---|
| 2017/0184875 | A1* | 6/2017 | Newman | G02C 7/049 |
| 2020/0012123 | A1 | 1/2020 | Newman | |
| 2020/0393702 | A1 | 12/2020 | Guillot et al. | |
| 2020/0409180 | A1 | 12/2020 | Guillot et al. | |
| 2021/0003864 | A1 | 1/2021 | Guillot et al. | |
| 2021/0048689 | A1 | 2/2021 | Guillot et al. | |
| 2021/0109378 | A1 | 4/2021 | Guillot et al. | |
| 2021/0116720 | A1 | 4/2021 | Guillot et al. | |
| 2021/0116722 | A1 | 4/2021 | Guillot et al. | |
| 2021/0199990 | A1 | 7/2021 | Guillot et al. | |
| 2021/0311330 | A1 | 10/2021 | Guillot et al. | |
| 2021/0311331 | A1 | 10/2021 | Guillot et al. | |
| 2022/0082858 | A1 | 3/2022 | Guillot et al. | |
| 2022/0082859 | A1 | 3/2022 | Guillot et al. | |
| 2022/0100000 | A1 | 3/2022 | Guillot et al. | |
| 2024/0151989 | A1* | 5/2024 | Zhou | A45C 11/04 |
| 2025/0044617 | A1* | 2/2025 | Matsuoka | G02C 7/022 |
| 2025/0110350 | A1* | 4/2025 | Cho | G02C 7/027 |
| 2026/0016706 | A1* | 1/2026 | Liu | G02C 7/022 |

FOREIGN PATENT DOCUMENTS

| | | | |
|---|---|---|---|
| WO | WO 2015/106375 | A1 | 7/2015 |
| WO | WO 2015/147758 | A1 | 10/2015 |
| WO | WO 2021/069443 | A1 | 4/2021 |
| WO | WO 2022/136056 | A1 | 6/2022 |
| WO | WO 2022/136192 | A1 | 6/2022 |

OTHER PUBLICATIONS

Karim et al. "The *what and why* of perceptual asymmetries in the visual Domain", Advances in Cognitive Psychology, vol. 6, 2010, pp. 103-115.

Levine et al. "The relative capabilities of the upper and lower visual hemifields", Vision Research 45 (2005) pp. 2820-2830.

Skrandies "The Upper and Lower Visual Field of Man: Electrophysiological and Functional Differences", Progress in Sensory Physiology, vol. 8, 1987, pp. 1-93.

* cited by examiner

LENS ELEMENT

TECHNICAL FIELD

The disclosure relates to a lens element intended to be worn in front of an eye of a wearer and having at least a prescribed refractive power, and to a method, for example implemented by computer means for determining a lens element according to the disclosure.

BACKGROUND

Myopia of an eye is characterized by the fact that the eye focuses distant objects in front of its retina. Myopia is usually corrected using a concave lens and hyperopia is usually corrected using a convex lens.

Myopia, also referred as to short-sightedness, has become a major public health problem worldwide. Accordingly, a large effort has been made to develop solutions aiming to slow down myopia progression.

Most of the recent management strategies for myopia progression involved acting on the peripheral vision using optical defocus. This approach has received a great deal of interest since works in chicks and primates showed that foveal refractive error could be manipulated through peripheral optical defocus without the involvement of an intact fovea. Several methods and products are used to slow down myopia progression by inducing such peripheral optical defocus. Among these solutions, orthokeratology contact lenses, soft bifocal and progressive contact lenses, circular progressive ophthalmic lenses, and lenses with array of microlenses have been shown to be more or less effective, through randomized controlled trials.

Myopia control solutions with array of microlenses have been proposed, in particular by the applicant. The purpose of this array of microlenses is to provide an optical blurred image, in front of the retina, triggering a stop signal to the eyes growth, while enabling a good vision.

Numerous studies have showed that perceptual skills are not uniform throughout the visual field. For instance, on average, subjects perform better when stimuli are in the lower visual hemi-field than in the upper visual hemi-field. Likewise, the left and right visual fields exhibit different visual processing specificities. Typically, spatial information is processed more precisely in the left visual field and non-spatial information in the right visual field.

All these asymmetries have inborn neural/physiological origins but are also susceptible to visual experience which leads to individual variability.

Therefore, there is a need to provide lenses comprising microlenses pattern adapted to the individual functional asymmetries of the visual field.

SUMMARY

To this end, the disclosure proposes a lens element adapted to a wearer and intended to be worn in front of an eye of the wearer, the lens element comprising:

- a refraction area having a refractive power based on a prescribed refractive power Px for said eye of the wearer and comprising at least a central zone,
- a plurality of optical elements having an optical function of not focusing an image on the retina of the eye of the wearer, wherein the optical elements are organized based at least on the prescribed refractive power Px and the functional asymmetries over the visual field of the wearer.

Advantageously, not focusing an image on the retina of the wearer allows creating a control signal that reduces the progression of abnormal refractions of the eye such as myopia or hyperopia. Moreover, taking into account the wearer's preferences and asymmetries allows improving the visual performances of the wearer. In other words, the invention allows both slowing down the progression of the abnormal refraction of the eye of the wearer and maintaining the best visual acuity for the wearer.

According to further embodiments which can be considered alone or in combination:

- the lens element is divided in five complementary zones, the central zone and four quadrants at 45°,
- the four quadrants comprise a right quadrant Q1 between 315° and 45° in the TABO convention, an upper quadrant Q2 between 45° and 135° in the TABO convention, a left quadrant Q3 between 135° and 225° in the TABO convention, and a lower quadrant Q4 between 225° and 315° in the TABO convention; and/or
- the central zone has a characteristic dimension greater than 4 mm and smaller than 20 mm; and/or
- the central zone is centered on a reference point of the lens element; and/or
- the reference point is one of a geometrical center, optical center, near vision point, or far vision point of the lens element; and/or
- the refraction area has a first refractive power based on a prescription for correcting an abnormal refraction of the eye of the wearer and at least a second refractive power different from the first refractive power; and/or
- the difference between the first optical power and the second optical power is greater than or equal to 0.5 D; and/or
- the refraction area is formed as the area other than the areas formed by the plurality of optical elements; and/or
- at least one, for example all of, the optical elements is configured to not focus on the retina of the wearer; and/or
- at least one, for example all of, the optical elements is configured to focus in front of retina of the wearer; and/or
- at least one, for example all of, the optical elements is configured to focus behind of retina of the wearer; and/or
- at least one, for example all of, the optical elements is configured to create a caustic in front of the retina of the eye of the wearer; and/or
- at least one, for example more than 50%, preferably all, of the optical elements has a spherical optical function in standard wearing conditions; and/or
- at least one, for example more than 50%, preferably all, of the optical elements has a non-spherical optical function in standard wearing conditions; and/or
- at least one, for example more than 50%, preferably all, of the optical elements comprises a cylindrical power; and/or
- at least one, for example more than 50%, preferably all, of the optical elements is a multifocal refractive microlens; and/or
- at least one, for example more than 50%, preferably all, of the optical elements is an aspherical microlens; and/or
- at least one, for example more than 50%, preferably all, of the optical elements comprises an aspherical surface, with or without a rotational symmetry; and/or at least one, for example more than 50%, preferably all, of the optical elements is a toric refractive microlens; and/or at least one, for example more than 50%, preferably all, of the optical elements comprises a toric surface; and/or at least one, for example more than 50%, preferably all, of the optical elements is made of a birefringent material; and/or at least one, for example more than 50%, preferably all, of the optical elements is a diffractive element; and/or at least one, for example more than 50%, preferably all, of the diffractive elements comprise a metasurface structure; and/or at least one, for example more than 50%, preferably all, of the optical elements is a multifocal binary component; and/or at least one, for example more than 50%, preferably all, of the optical elements is a pixelated lens; and/or at least one, for example more than 50%, preferably all, of the optical elements is a T-Fresnel lens; and/or at least two, for example more than 50%, preferably all, of the optical elements are independent; and/or the density of optical elements in the left quadrant Q3 and the lower quadrant Q4 is lower than the density of optical elements in the right quadrant Q1 and the upper quadrant Q2; and/or the optical power of optical elements in the left quadrant Q3 and the lower quadrant Q4 is higher than the optical power of optical elements in the right quadrant Q1 and the upper quadrant Q2; and/or the mean optical power of optical elements in the left quadrant Q3 and the lower quadrant Q4 is higher than the optical power of optical elements in the right quadrant Q1 and the upper quadrant Q2; and/or the optical elements are configured so that along at least one section of the lens element, the mean sphere of the optical elements increases from a point of said section towards the peripheral part of said section; and/or the optical elements are configured so that along at least one section of the lens element, the mean cylinder of optical elements increases from a point of said section towards the peripheral part of said section; and/or the optical elements are configured so that along the at least one section of the lens element the mean sphere and/or the mean cylinder of the optical elements increases from the center of said section towards the peripheral part of said section; and/or the refraction area comprises an optical center and the optical elements are configured so that along any section passing through the optical center of the lens element, the mean sphere and/or the mean cylinder of the optical elements increases from the optical center towards the peripheral part of the lens element; and/or the optical elements are configured so that in standard wearing condition the at least one section is a horizontal section; and/or the refraction area comprises a far vision reference point, a near vision reference, and a meridian joining the far and near vision reference points, the optical elements are configured so that in standard wearing conditions along any horizontal section of the lens element the mean sphere and/or the mean cylinder of the optical elements increases from the intersection of said horizontal section with the meridian towards the peripheral part of the lens element; and/or the mean sphere and/or the mean cylinder increase function along the sections are different depending on the position of said section along the meridian; and/or the mean sphere and/or the mean cylinder increase function along the sections are unsymmetrical; and/or the optical elements are configured so that along the at least one section of the lens element the mean sphere and/or the mean cylinder of optical elements increases from a first point of said section towards the peripheral part of said section and decreases from a second point of said section towards the peripheral part of said section, the second point being closer to the peripheral part of said section than the first point; and/or the mean sphere and/or the mean cylinder varying function along the at least one section is a Gaussian function; and/or the mean sphere and/or the mean cylinder varying function along the at least one section is a Quadratic function; and/or at least part, for example all, of the optical elements have a contour shape being inscribable in a circle having a diameter greater than or equal to 0.2 mm, for example greater than or equal to 0.4 mm, for example greater than or equal to 0.6 mm, for example greater than or equal to 0.8 mm and smaller than or equal to 2.0 mm, for example smaller than or equal to 1.0 mm; and/or at least one, for example all, of the optical elements are non-contiguous; and/or at least one, for example all, of the optical elements are contiguous; and/or at least one, for example all, of the optical elements have an annular shape, for example around part of the refraction area; and/or at least part, for example all, of the optical elements are located on the front surface of the lens element; and/or at least part, for example all, of the optical elements are located on the back surface of the lens element; and/or at least part, for example all, of the optical elements are located between the front and the back surfaces of the lens element; and/or the lens element comprises an ophthalmic lens bearing the refraction area and a clip-on bearing the plurality of at least three optical elements adapted to be removably attached to the ophthalmic lens when the lens element is worn; and/or for every circular zone having a radius comprised between 2 and 4 mm comprising a geometrical center located at a distance of the optical center of the lens element greater or equal to said radius+5 mm, the ratio between the sum of areas of the parts of the optical elements located inside said circular zone and the area of said circular zone is comprised between 20% and 70%; and/or the optical elements are positioned on a network, for example a structured mesh; and/or the optical elements are positioned on a squared mesh or a hexagonal mesh or a triangle mesh or an octagonal mesh; and/or the mesh structure is a random mesh, for example a Voronoi mesh; and/or the optical elements are positioned along a plurality of concentric rings; and/or the optical elements are organized in at least two groups of optical elements, each group of optical elements is organized in at least two concentric rings having the same center, the concentric ring of each group of optical element is defined by an inner diameter corresponding to the smallest circle that is tangent to at least one optical element of said group and an outer diameter corresponding to the largest circle that is tangent to at least one optical elements of said group; and/or

- at least part of, for example all, the concentric rings of optical elements are centered on the optical center of the surface of the lens element on which said optical elements are disposed; and/or
- the concentric rings of optical elements have a diameter comprised between 9.0 mm and 60 mm; and/or
- the distance between two successive concentric rings of optical elements is greater than or equal to 2.0 mm, for example 3.0 mm, preferably 5.0 mm, the distance between two successive concentric rings being defined by the difference between the inner diameter of a first concentric ring and the outer diameter of a second concentric ring, the second concentric ring being closer to the periphery of the lens element; and/or
- the lens element further comprises optical elements positioned radially between two concentric rings; and/or
- the optical elements are organized in a plurality of radial segments; and/or
- the plurality of radial segments are centered on the central zone of the lens element.

The disclosure further relates to a method, for example implemented by computer means, for determining and/or optimizing and/or providing a lens element adapted to a wearer and intended to be worn in front of an eye of the wearer, the lens element comprising:

- a refraction area having a refractive power based on a prescribed refractive power Px for said eye of the wearer and comprising at least a central zone; and
- a plurality of optical elements having an optical function of not focusing an image on the retina of the eye of the wearer;

wherein the method comprises:

- obtaining wearer's data, the wearer's data comprising at least prescription data relating to the prescribed refractive power Px;
- obtaining asymmetries data, the asymmetries data relating to the wearer's functional asymmetries over the visual field; and
- optimizing at least one parameter of the optical elements based on the wearer's data and asymmetries data.

Advantageously, the method according to the disclosure allows providing lens elements comprising areas having different optical properties. In particular, the process allows providing a lens element best adapted for the wearer, providing at the same time an optimum function of slowing down an abnormal refraction of the wearer while maintaining the best visual performances and/or comfort for the wearer.

According to further embodiments of the disclosure which can be considered alone or in combination:

- optimizing at least one parameter of the optical elements comprises determining the density and/or optical power of the optical elements in the lower and left quadrants of the lens elements; and/or
- the method comprises obtaining sensitivity data relating at least to the visual sensitivity of the wearer throughout the whole vision field, and optimizing the at least one parameter of the optical elements considering said sensitivity data; and/or
- the visual sensitivity relates to visual acuity and/or contrast sensitivity and/or motion sensitivity and/or visual comfort
- the method comprises manufacturing the lens element based on the wearer's data and the optimized parameter of the optical element; and/or
- the method comprises applying a layer of coating at least partially on part of a surface of the lens element, for example on part of the refraction area and part of the optical elements.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION

In the reminder of the description, terms like «up», «bottom», «horizontal», «vertical», «above», «below», «front», «rear» or other words indicating relative position may be used. These terms are to be understood in the wearing conditions of the optical lens.

The disclosure relates to a lens element adapted for a person and intended to be worn in front of an eye of said person.

In the context of the present invention, the term "lens element" can refer to an uncut optical lens or a spectacle optical lens edged to fit a specific spectacle frame or an ophthalmic lens or an intraocular lens or a contact lens, or an optical device adapted to be positioned on the ophthalmic lens. The optical device may be positioned on the front or back surface of the ophthalmic lens. The optical device may be an optical patch or film. The optical device may be adapted to be removably positioned on the ophthalmic lens for example a clip configured to be clipped on a spectacle frame comprising the ophthalmic lens.

Figure 1:
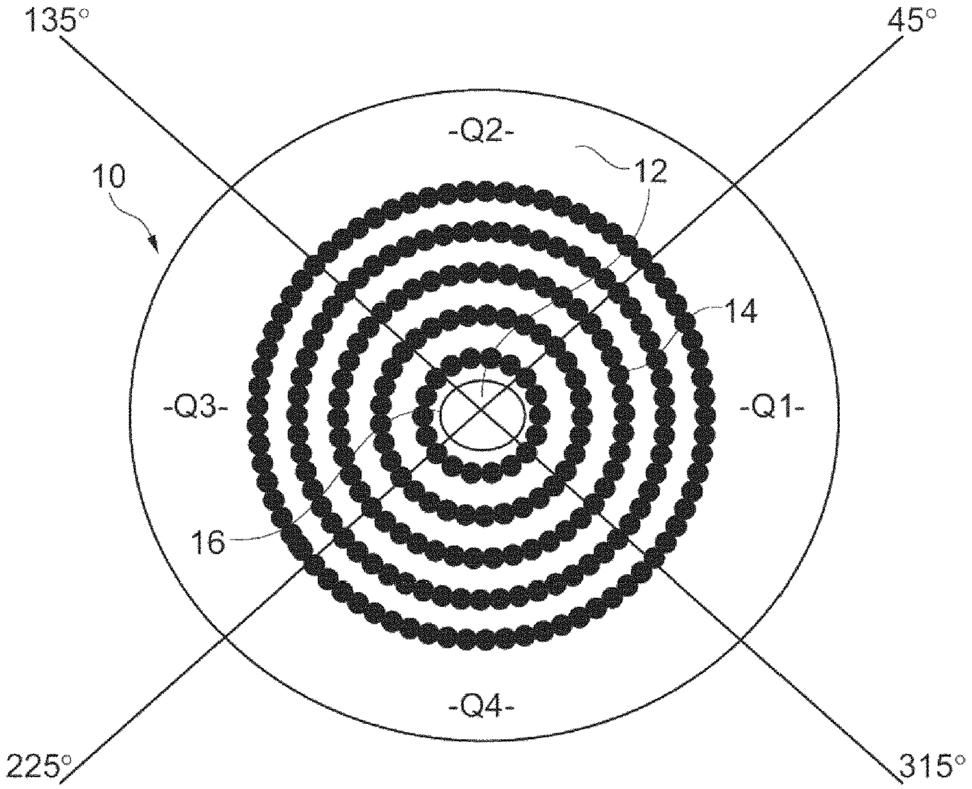
FIG. 1 illustrates a front view of a lens element according to an embodiment of the disclosure.
Figure 2:
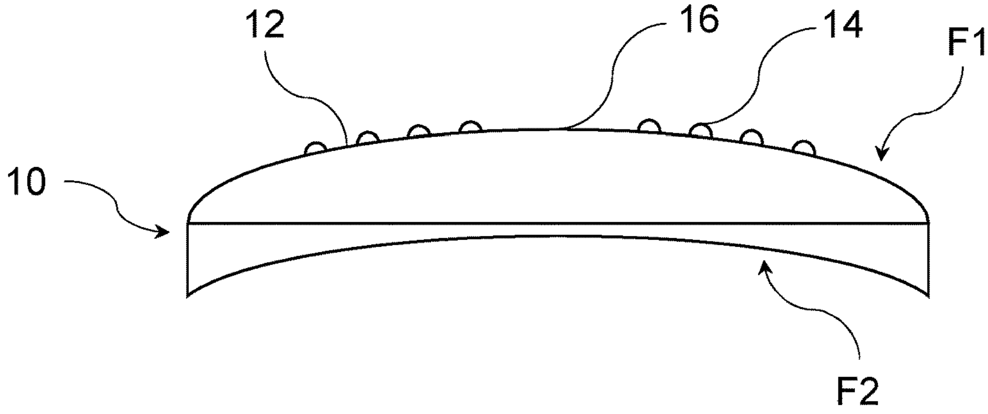
FIG. 2 illustrates a profile view a lens element according to an embodiment of the disclosure.

As represented in FIGS. 1 and 2, the lens element 10 according to the disclosure comprises a refraction area 12 and a plurality of optical elements 14.

As represented in FIG. 2, the lens element comprises at least a first surface and a second surface opposed to the second surface. For example, the first surface may comprise an object side surface F1 formed as a convex curved surface toward an object side and the second surface may comprise an eye side surface F2 formed as a concave surface having a different curvature than the curvature of the object side surface. The lens element 10 may be made of organic material, for example polycarbonate, or made of mineral material such as glass.

As represented in FIG. 1, the lens element may be divided in five complementary zones, a central zone 16 and four quadrants Q1, Q2, Q3 and Q4. The four quadrants comprise a right quadrant Q1 between 315° and 45°, an upper quadrant Q2 between 45° and 135°, a left quadrant Q3 between 135° and 225°, and a lower quadrant Q4 between 225° and 315°. The disposition of the different quadrants is defined in the TABO convention.

At least one part, preferably all, of a surface of the lens element 10 may be covered by at last one layer of coating element. The at least one layer of coating element may comprise features selected from the group consisting of anti-scratch, anti-reflection, anti-smudge, anti-dust, UV30 filtration, blue light-filtration, anti-abrasion features.

As illustrated in FIGS. 1 and 2, the lens element 10 comprises a refraction area 12.

The refraction area 12 has a refractive power Px based on the prescription of the eye of the person for which the lens element is adapted. The prescription is for example adapted for correcting an abnormal refraction of the eye of the wearer.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The prescription may comprise an indication that the eye of the wearer has no defect and that no refractive power is to be provided to the wearer. In such case the refractive area is configured so as to not provide any refractive power.

The refraction area is preferably formed as the area other than the areas formed of the plurality of optical elements. In other words, the refraction area is the complementary area to the areas formed of the plurality of optical elements.

As illustrated in FIGS. 1 and 2, the refraction area 12 may comprise at least the central zone 16 of the lens element 10.

The central zone 16 may have a characteristic dimension greater than 4 mm and smaller than 22 mm, for example smaller than 20 mm.

The central zone 16 may be centered on a reference point of the lens element 10. The reference point on which the central zone may be centered is either one of a geometrical center and/or an optical and/or a near vision reference point and/or a far vision reference point of the lens element.

Preferably, the central zone 16 is centered on, or at least comprises a framing reference point that faces the pupil of the wearer gazing straight ahead in standard wearing conditions.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°, preferably equal to 0°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearing condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

Another example of standard wearing condition more adapted for younger wearers may be defined by a pantoscopic angle of 0°, a Cornea to lens distance of 12 mm, a Pupil-cornea distance of 2 mm, a CRE to pupil distance of 11.5 mm, a CRE to lens distance of 25.5 mm and a wrap angle of 0°.

Preferably, the central zone 16 comprises the optical center of the lens and has a characteristic dimension greater than 4 mm-corresponding to +/−8° peripheral angle on the retina side, and smaller than 22 mm corresponding to +/−44° peripheral angle on the retina side, for example smaller than 20 mm corresponding to +/−40° peripheral angle on the retina side. The characteristic dimension may be a diameter or the major minor axes of an ellipse shaped central zone.

The refraction area 12 may further comprise at least a second refractive power Pp different from the prescribed refractive power Px. In the sense of the invention, the two refractive powers are considered different when the difference between said refractive powers is greater than or equal to 0.5 D.

When the refractive power Px is prescribed to compensate a myopia of the eye of the wearer, the second refractive power Pp may be greater than the refractive power Px.

When the refractive power Px is prescribed to compensate hyperopia of the eye of the wearer, the second refractive power Pp may be smaller than the refractive power Px.

The refraction area 12 may comprise a continuous variation of refractive power. For example, the refractive area may have a progressive addition design. The optical design of the refraction area may comprise a fitting cross where the optical power is negative, and a first zone extending in the temporal side of the refractive are when the lens element is being worn by a wearer. In the first zone, the optical power increases when moving towards the temporal side, and over the nasal side of the lens, the optical power of the ophthalmic lens is substantially the same as at the fitting cross. Such optical design is disclosed in greater details in WO2016/107919.

Alternatively, the refractive power in the refraction area 12 may comprise at least one discontinuity.

As illustrated in FIGS. 1 and 2, the lens element 10 comprises a plurality of optical elements 14.

The plurality of at least three optical element has an optical function of not focusing an image on the retina of the eye of the wearer. In other words, when the wearer wears the lens element, for example in standard wearing conditions, rays of light passing through the plurality of optical elements will not focus on the retina of the eye of the wearer. For example, the optical elements may focus in front and/or behind the retina of the eye of the wearer.

Advantageously, not focusing an image on the retina of the wearer allows creating a control signal that suppresses, reduces, or at least slows down the progression of abnormal refractions, such as myopia or hyperopia, of the eye of the person wearing the lens element.

At least one, preferably more than 50%, more preferably all the optical elements 14 may be configured, for example in standard wearing conditions, to focus elsewhere than on the retina of the wearer. In other words, the plurality of optical elements may be configured to focus in front and/or behind the retina of the eye of the wearer.

At least one, preferably more than 50%, for example all, of the optical elements 14 has a shape configured so as to create a caustic in front of the retina of the eye of the person. In other words, such optical element is configured so that, when the person wears the lens element in standard viewing condition, every section plane where the light flux is concentrated if any, is located in front of the retina of the eye of the person.

At least one, for example more than 50%, preferably all, of the optical elements may have a spherical optical function in standard wearing conditions.

At least one, for example more than 50%, preferably all, of the optical elements may have a non-spherical optical function in standard wearing conditions. By "non-spherical optical function", it should be understood as not having a single focus point. For example, rays of light passing through the optical elements having a non-spherical optical function will provide a volume of not focused light.

At least one, for example more than 50%, preferably all, of the optical elements may comprise a cylindrical power.

At least one, for example more than 50%, preferably all, of the optical elements may be a multifocal refractive micro-lens. In the sense of the invention, "multifocal refractive micro-lens" includes bifocals (with two focal powers), trifocals (with three focal powers), progressive addition lenses, with continuously varying focal power, for example aspherical surface lenses.

At least one, for example more than 50%, preferably all, of the optical elements may be an aspherical microlens. In the sense of the invention, aspherical microlenses have a continuous power evolution over their surface, for example from a geometrical or optical center to the periphery of the microlens.

An aspherical microlens may have an asphericity comprised between 0.1 D and 3D. The asphericity of an aspherical microlens corresponds to the ratio of optical power measured in the center of the microlens and the optical power measured in the periphery of the microlens. The center of the microlens may be defined by a spherical area centered on the geometrical center of the microlens and having a diameter comprised between 0.1 mm and 0.5 mm, preferably equal to 2.0 mm. The periphery of the microlens may be defined by an annular zone centered on the geometrical center of the microlens and having an inner diameter comprised between 0.5 mm and 0.7 mm and an outer diameter comprised between 0.70 mm and 0.80 mm. According to an embodiment of the invention, the aspherical microlenses have an optical power in their geometrical center comprised between 2.0 D and 7.0 D in absolute value, and an optical power in their periphery comprised between 1.5 D and 6.0 D in absolute value.

At least one, for example more than 50%, preferably all, of the optical elements may comprise an aspherical surface, with or without a rotational symmetry.

At least one, for example more than 50%, preferably all, of the optical elements may comprise a toric surface. A toric surface is a surface of revolution that can be created by rotating a circle or arc about an axis of revolution (eventually positioned at infinity) that does not pass through its center of curvature. Toric surface lenses have two different radial profiles at right angles to each other, therefore producing two different focal powers. Toric and spheric surface components of toric lenses produce an astigmatic light beam, as opposed to a single point focus.

At least one, preferably more than 50%, for example all, of the optical element, is made of a birefringent material. In other words, the optical element is made of a material having a refractive index that depends on the polarization and propagation direction of light. The birefringence may be quantified as the maximum difference between refractive indices exhibited by the material.

At least one, preferably more than 50%, for example all of the optical element, is made of a diffractive lens. At least one, preferably more than 50%, for example all, of the diffractive lenses may comprise a metasurface structure as disclosed in WO2017/176921. The diffractive lens may be a Fresnel lens whose phase function $\psi(r)$ has $\pi$ phase jumps at the nominal wavelength. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders associated to dioptric powers 0 $\delta$ and a positive one P, for example 3 $\delta$.

At least one, preferably more than 50%, for example all of the optical element, is a multifocal binary component. A binary structure displays mainly two dioptric powers simultaneously, for example denoted $-P/2$ and $P/2$.

At least one, preferably more than 50%, for example all of the optical element, is a pixelated lens. An example of multifocal pixelated lens is disclosed in Eyal Ben-Eliezer et al, APPLIED OPTICS, Vol. 44, No. 14, 10 May 2005.

At least two, preferably more than 50%, for example all, of the optical elements are independent. In the sense of the invention, two optical elements are considered as independent if producing independent images. In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

The optical elements 14 are organized based at least on the prescribed refractive power Px of the refractive area 12 and functional asymmetries over the visual field of the wearer.

Perceptual skills are not uniform throughout the visual field. Depending on the position of visual stimuli in the visual field of the person, the visual information are processed differently based on the region of the visual field on average, subjects perform better when stimuli are in the lower visual hemi-field than in the upper visual hemi-field. Similarly, spatial information is processed more precisely in the left visual field than in the right visual field. All these functional asymmetries have inborn neural/physiological origins, but are also susceptible to visual experience. As such, they are very specific to each person.

The term "functional asymmetries" refers to the perceptual variability or asymmetry resulting from the preferential physiological responses to some visual stimuli and/or to stimuli at some specific retinal location.

For example, the functional asymmetries may refer to the wearer's asymmetry in orientation processing where the percept's relationship to the stimulus changes with the orientation of the stimulus. Similarly, the functional asymmetries may refer to the wearer's asymmetry in motion processing and/or the wearer asymmetry in spatial frequency processing.

Advantageously, taking into account the wearer's preferences and asymmetries allows improving the visual performances and visual comfort of the wearer.

Figure 3:
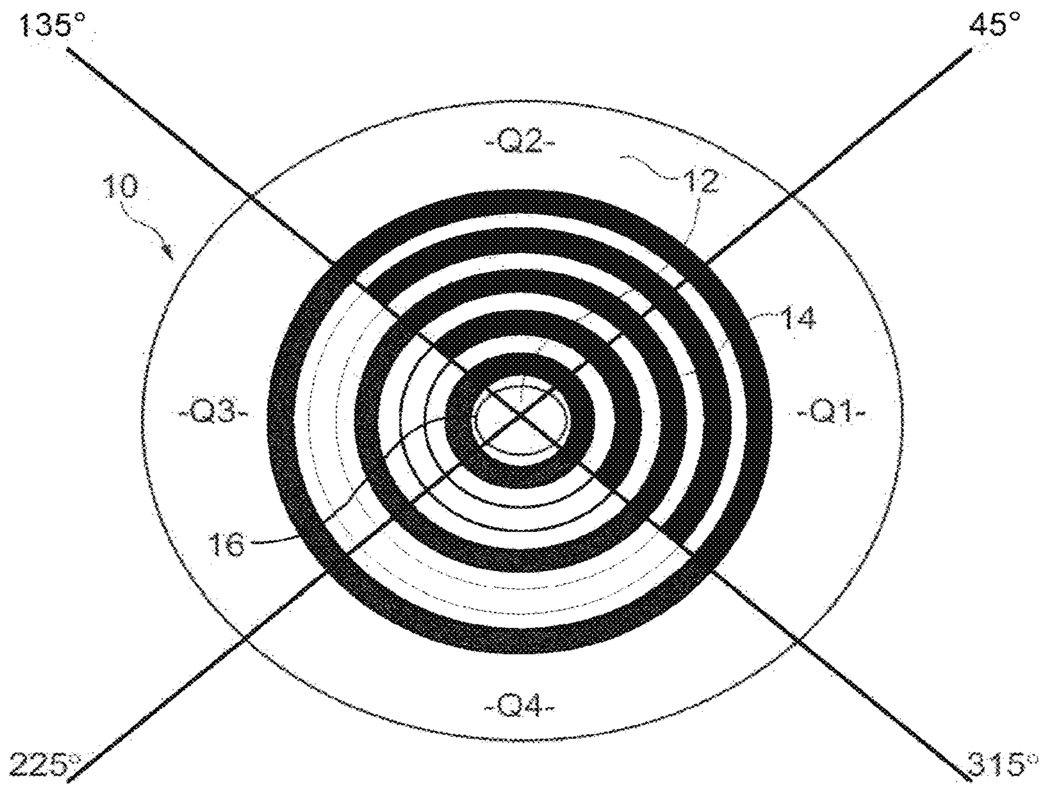
FIG. 3 illustrates a front view of a lens element according to an embodiment of the disclosure.
Figure 4:
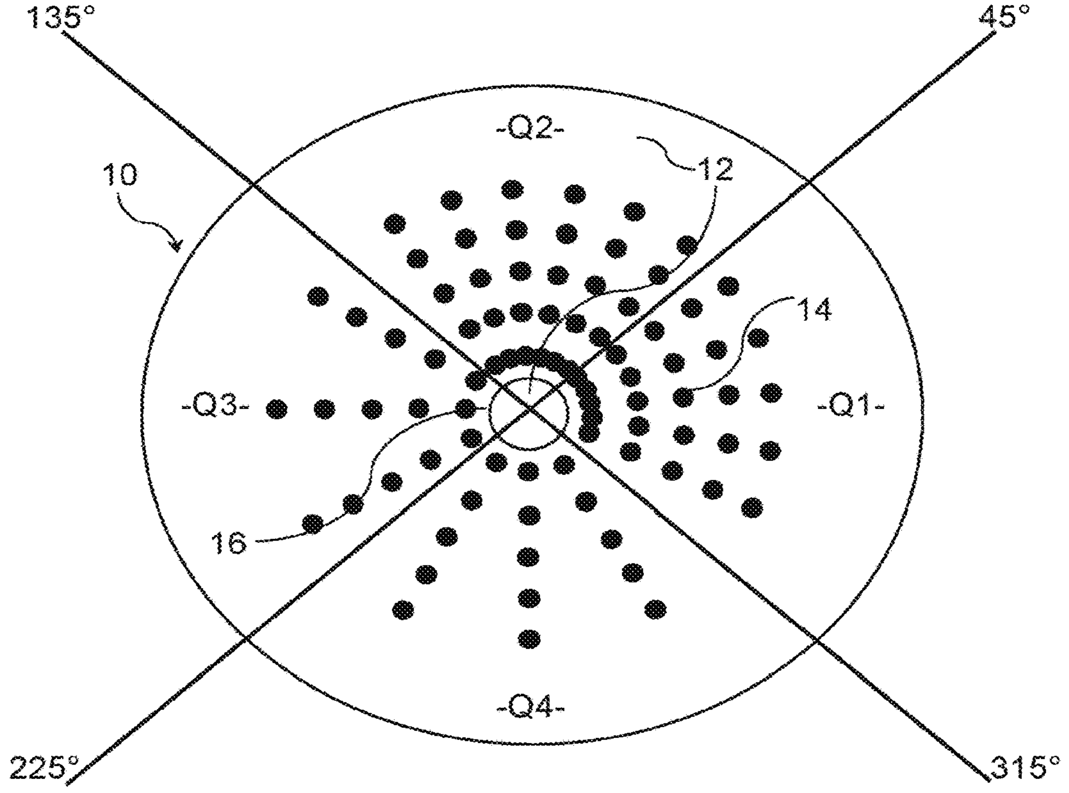
FIG. 4 illustrates a front view of a lens element according to an embodiment of the disclosure.

As illustrated in FIGS. 3 and 4, the density of optical elements in the left quadrant Q3 and/or the lower quadrant Q4 may be lower than the density of optical elements in the right quadrant Q1 and/or the upper quadrant Q2.

The lower visual field is known to present a dominance in temporal and contrast sensitivities, visual acuity, spatial resolution, orientation, hue and motion processing over the upper visual field. The right visual field is known to present a dominance for high spatial frequencies and local stimuli over the left visual field.

The density of optical elements on the lens element directly affects the visual acuity of the person wearing the lens. In particular, a high density of optical elements on the lens element is associated with a lower visual acuity than a low density of optical elements on the lens elements.

Advantageously, having a lower density of optical elements in the left and/or lower quadrant of the lens element provide a better visual acuity, contrast sensitivity, spatial resolution, hue and motion processing, high frequency processing and local stimuli processing. In other words, the visual performances and comfort of the person wearing said lens element are improved.

As illustrated in FIGS. 3 and 4, the optical power of the optical elements 14 in the left quadrant Q3 and/or the lower quadrant Q4 may be higher than the optical power of the optical elements in the right quadrant Q1 and/or the upper quadrant Q2. Similarly, the mean optical power of the optical elements in the left quadrant Q3 and/or the lower quadrant Q4 may be higher than the mean optical power of the optical elements in the right quadrant Q1 and/or the upper quadrant Q2.

Advantageously, having optical elements with a higher optical power in the lower and/or left quadrant of the lens element than the upper and/or right quadrant of the lens element allows generating a myopia control system signal that slow down the progression of the abnormal refraction of the eye of the wearer while improving the overall visual performances of the wearer.

As illustrated in FIG. 3, the density of optical elements 14 may be lower and the mean optical power or the mean optical power of the optical element may be higher in the lower and/or left quadrants than in the upper and right quadrants of the lens element.

Advantageously, increasing the optical power of the optical elements in the quadrants with a low density of optical elements allows providing a strong myopia control signal, thereby slowing down the progression of the abnormal refraction of the eye of the wearer, while maintaining the best visual performance and visual comfort for the wearer.

The optical elements May 14 be configured so that along at least one section of the lens element, the mean sphere of the optical elements varies, for example increases or decreases, from a point of said section towards the peripheral part of said section.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}}, \text{ and}$$

$$SPH_{min} = (n-1)*CURV_{min} = \frac{n-1}{R_{max}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the index of the constituent material of the lens.

As is well known, a mean sphere SPHmean at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula:

$$CYL = |SPH_{max} - SPH_{min}|.$$

The optical elements 14 may be configured so that along at least one section of the lens element, the mean cylinder of the optical elements varies, for example increases or decreases, from a point of said section towards the peripheral part of said section.

Varying the mean sphere and/or mean cylinder of the optical elements along a section of the lens element allows varying the defocus and by extension the intensity of the myopia control signal which lead to a better control of the progression of the abnormal refraction of the eye.

The optical elements 14 may be configured so that along the at least one section of the lens element the mean sphere and/or the mean cylinder of the optical elements increases from the center of said section towards the peripheral part of said section.

The optical elements may be configured so that, in standard wearing conditions, the at least one section is a horizontal section.

The refraction area 12 may comprise an optical center and the optical elements 14 may be configured so that along any section passing through the optical center of the lens element, the mean sphere and/or the mean cylinder of the optical elements varies, for example increases from the optical center towards the peripheral part of the lens element.

The refraction area 12 may comprise a far vision reference point, a near vision reference, and a meridian joining the far and near vision reference points, and the optical elements 14 may be configured so that in standard wearing conditions along any horizontal section of the lens element the mean sphere and/or the mean cylinder of the optical elements varies, for example increases from the intersection of said horizontal section with the meridian towards the peripheral part of the lens element.

The mean sphere and/or the mean cylinder increase or decrease function along the sections may be different depending on the position of said section along the meridian.

The mean sphere and/or the mean cylinder increase or decrease function along the sections may be unsymmetrical.

The optical elements 14 may be configured so that along the at least one section of the lens element the mean sphere and/or the mean cylinder of optical elements increases from a first point of said section towards the peripheral part of said section and decreases from a second point of said section towards the peripheral part of said section, the second point being closer to the peripheral part of said section than the first point.

Advantageously, it allows improving the slowdown of the progression of the abnormal refraction of the eye of the wearer.

The mean sphere and/or the mean cylinder varying function along the at least one section may be a Gaussian function or a Quadratic function.

At least part, for example more than 50%, preferably all, of the optical elements 14 may be microlenses having a contour shape being inscribable in a circle having a diameter greater than or equal to 0.2 mm, for example greater than or equal to 0.4 mm, for example greater than or equal to 0.6 mm, for example greater than or equal to 0.8 mm and smaller than or equal to 2.0 mm, for example smaller than or equal to 1.0 mm.

Alternatively, as illustrated in FIG. 3, the optical elements may have a semi-annular shape.

Advantageously, the semi-annular shape increases the area of the lens element covered by the optical elements, thereby generating higher level of myopia control signal, and thus an improved control of the progression of the abnormal refraction of the eye of the wearer.

As represented in FIG. 4, at least one, for example all, of the optical elements 14 may be non-contiguous.

As represented in FIGS. 1 and 3, at least one, preferably all, of the optical elements are contiguous.

In the sense of the disclosure, two optical elements located on a surface of the lens substrate are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

Advantageously, having contiguous optical elements helps improving the aesthetic of the lens element and is easier to manufacture.

At least one, for example all, of the optical elements 14 have an annular shape or semi-annular shape, for example around part of the refraction area. Advantageously, it provides a good repartition of the refraction area and optical elements thereby allowing to provide a better correction of the abnormal refraction of the eye of the wearer while maintaining the effective function of the optical elements to reduce, or at least slow down, the progression of said abnormal refraction.

At least part, for example all, of the optical elements 14 may be located on the front surface of the lens element. The front surface of the lens element corresponds to the object side F1 of the lens element facing towards the object.

At least part, for example all, of the optical elements 14 may be located on the back surface of the lens element. The back surface of the lens element corresponds to the eye side F2 of the lens element facing towards the eye.

At least part, for example all, of the optical elements 14 may be located between the front and the back surfaces of the lens element, for example when the lens element is encapsulated between two lens substrates. Advantageously, it provides a better protection to the optical elements.

Alternatively, the lens element may comprise an ophthalmic lens bearing the refraction area 12 and a clip-on bearing the plurality of optical elements 14 and adapted to be removably attached to the ophthalmic lens when the lens element is worn. Advantageously, it allows managing when the function of slowing down the abnormal refraction of the eye should be present.

For every circular zone having a radius comprised between 2 and 4 mm comprising a geometrical center located at a distance of the optical center of the lens element greater or equal to said radius+5 mm, the ratio between the sum of areas of the optical elements 14 located inside said circular zone and the area of said circular zone is comprised between 20% and 70%.

The optical elements may be randomly disturbed on the lens element. Alternatively, the optical elements are positioned on the lens element on a network, for example a structured mesh. The structured mesh may be a squared mesh or a hexagonal mesh or a triangle mesh or an octagonal mesh. Alternatively, the mesh structure may be a random mesh, for example a Voronoi mesh.

As illustrated in FIGS. 1 and 4, the optical elements 14 may be organized along a plurality of concentric rings. The concentric rings of optical elements may be annular rings.

Advantageously, such configuration provides a great balance between the slowdown of the abnormal refraction of the eye of the wearer and the visual performances or comfort of the wearer.

In particular, the optical elements may be organized in at least two groups of optical elements, each group of optical elements being organized in at least two concentric rings having the same center. The concentric ring of each group of optical elements is defined by an inner diameter and an outer diameter.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element.

The distance $D_i$ between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

The optical elements may be organized in concentric rings centered on the optical center of the surface of the lens element. In other words, the optical center of the lens element and the center of the concentric rings of optical elements may coincide. For example, the geometrical center of the lens element, the optical center of the lens element, and the center of the concentric rings of optical elements coincide. In the sense of the disclosure, the term coincide should be understood as being really close together, for example distanced by less than 1.0 mm.

The distance $D_i$ between two successive concentric rings may vary according to i. For example, the distance $D_i$ between two successive concentric rings may vary between 1.0 mm and 5.0 mm.

The distance $D_i$ between two successive concentric rings of optical elements may be greater than 1.00 mm, preferably 2.0 mm, more preferably 4.0 mm, even more preferably 5.0 mm. Advantageously, having the distance $D_i$ between two successive concentric rings of optical elements greater than 1.00 mm allows managing a larger refraction area between these rings of optical elements and thus provides better visual acuity.

According to an embodiment of the disclosure, the distances $D_i$ between two successive concentric rings i and i+1 may increase when i increases towards the periphery of the lens element.

The concentric rings of optical elements may have a diameter comprised between 9 mm and 60 mm.

The lens element may comprise optical elements disposed in at least two concentric rings, preferably more than 5, more preferably more than 10 concentric rings. For example, the optical elements may be disposed in 11 concentric rings centered on the optical center of the lens.

The diameter di of all optical elements on a concentric ring of the lens element may be identical. For example, all the optical elements on the lens element have an identical diameter.

As illustrated in FIG. 4, the optical elements 14 may be organized along a plurality of radial segments. The radial segments may be centered on a reference point of the lens element, for example on the optical or geometrical center of the lens element.

The inventors have observed that the level of myopia control signal delivered over the oblique directions is notably higher than the one proposed over the cardinal directions, thereby leading to a globally better myopia control treatment without side effects in terms of visual perception. In other words, such configuration improves the slowdown of the abnormal refraction of the eye of the wearer while maintaining optimum visual performances or comfort of the wearer.

The optical elements may be configured so that along at least one section of the lens the size or diameter of the optical elements varies, for example increases or decreases, from a point of said section towards the peripheral part of said section.

The optical elements may be configured so that the size or diameter of the optical elements increases from a first point of said section of the lens element towards the peripheral part of said section and decrease from a second point of said section towards the peripheral part of said section, the second point being closer to the peripheral part of said section than the first point.

The lens element may further comprise optical elements positioned radially between two concentric rings.

The disclosure further relates to a method, for example implemented by computer means, for determining and/or optimizing and/or providing a lens element 10.

Figure 5:
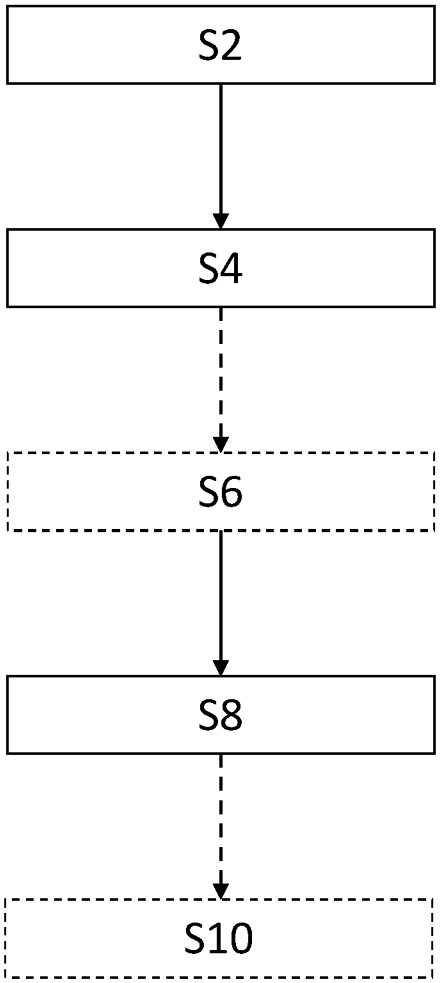
FIG. 5 illustrates a chart-flow embodiment of the method for providing a lens element according to an embodiment of the disclosure.

As illustrated in FIG. 5, the method comprises a step S2 during which wearer's data are obtained. The wearer's data comprise at least prescription data. The prescription data relate at least to a prescribed refractive power Px adapted to correct an abnormal refraction of an eye of the wearer.

The wearer's data may further comprise wearing condition data relating to wearing conditions of the lens element 10 adapted for the wearer. For example, the wearing condition data may correspond to standard wearing conditions. Alternatively, the wearing conditions data may be measured on the wearer and/or customized for example based on morphological or postural information obtained from the wearer.

The method further comprises a step S4 during which asymmetries data are obtained. The asymmetries data relate at least to the wearer's functional asymmetries over the visual field.

The term "functional asymmetries" refers to the perceptual variability or asymmetry resulting from the preferential physiological responses to some visual stimuli and/or to stimuli at some specific retinal location. For example, the functional asymmetries may refer to the wearer's asymmetry in orientation processing where the percept's relationship to the stimulus changes with the orientation of the stimulus. Similarly, the functional asymmetries may refer to the wearer's asymmetry in motion processing and/or the wearer asymmetry in spatial frequency processing.

The functional asymmetries data may be obtained through measurement of the responses of the wearer to visual stimuli displayed along the vertical and horizontal meridians, i.e., in the part of the visual field corresponding to the four quadrants. For example, for visual acuity, 100% contrast sinusoidal gratings of various spatial frequencies are displayed in different quadrants of the visual field.

The method further comprises a step S8 during which at least one parameter of the optical elements is determined and/or optimized based on the wearer's data and asymmetries data.

The parameter of the optical elements may refer to the optical power of the optical elements 14 and/or the mean optical power of the optical elements 14 in each quadrant Q1 to Q4 of the lens element 10, and/or the density of optical elements 14 in each quadrant Q1 to Q4 of the lens element 10.

Optimizing the at least one parameter of the optical elements may refer to determining the density and/or the optical power and/or the mean optical power of the optical elements in the left quadrant Q3 and the lower quadrant Q4.

Advantageously, optimizing the at least one parameter of the optical elements based on the wearer's data and asymmetries data allows providing a lens element best adapted to slowdown and correct the abnormal refraction of the eye of the wearer. In other words, it allows providing a lens element with an optimized balance between the visual performances and comfort and the function of slowing down the abnormal refraction of the eye.

As illustrated in FIG. 5, the method may further comprise a step S6 during which sensitivity data are obtained. The sensitivity data relate at least to the visual sensitivity of the wearer throughout its entire visual field.

The visual sensitivity data may relate to a visual acuity of the wearer, and more particularly to a drop of visual acuity of the wearer. The visual acuity of the wearer is a measure of the spatial resolution of the visual processing system of said wearer. The visual acuity commonly refers to the clarity of vision.

The visual sensitivity data may relate to a contrast sensitivity, and more particularly to a loss of contrast sensitivity. The contrast sensitivity relates to the ability of a person to discern the difference in brightness of adjacent areas. Commonly, the contrast sensitivity is measured using a Pelli Robson chart consisting of horizontal lines of letters whose contrast decreases with each successive line. Additionally, the contrast sensitivity may be measured using Gabor patches and sinewave gratings.

The visual sensitivity data may relate to a motion sensitivity, and more particularly to a loss of motion sensitivity. The motion sensitivity relates to the ability of a person to discern moving stimuli.

The visual sensitivity data may relate to a level of comfort of the wearer. The level of comfort of a wearer represents its perceived quality of comfort while looking through an ophthalmic lens.

The method may further comprise a step S10 of manufacturing the lens element based on the wearer's data and the optimized parameter of the optical elements. The step of manufacturing the lens element may also comprise applying at least one layer of coating element over at least part of the refraction and part of the optical element.

The disclosure relates to a computer program product comprising one or more stored sequences of instructions that are accessible to a processor and which, when executed by the processor, causes the processor to carry out the steps of a method according to the disclosure.

The disclosure further relates to a computer readable medium carrying one or more sequences of instructions of the computer program product according to the disclosure.

Furthermore, the disclosure relates to a program which makes a computer execute a method of the disclosure.

The disclosure also relates to a computer-readable storage medium having a program recorded thereon; where the program makes the computer execute a method of the disclosure.

The disclosure further relates to a device comprising a processor adapted to store one or more sequence of instructions and to carry out at least one of the steps of a method according to the disclosure.

The disclosure further relates to a non-transitory program storage device, readable by a computer, tangibly embodying a program of instructions executable by the computer to perform a method of the present disclosure.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A lens element adapted to a wearer and intended to be worn in front of an eye of the wearer, the lens element comprising:

- a refraction area having a refractive power based on a prescribed refractive power Px for said eye of the wearer and comprising at least a central zone; and
- a plurality of optical elements having an optical function of not focusing an image on a retina of the eye of the wearer,
- wherein the optical elements are organized based at least on the prescribed refractive power Px and functional asymmetries over a visual field of the wearer, and
- wherein the lens element is divided in five complementary zones, the central zone and four quadrants at 45° and at least one of density of optical elements is lower in the lower and left quadrants than in the higher and right quadrant or optical power of the optical elements is higher in the lower and left quadrants than in the higher and right quadrant.

2. The lens element according to claim 1, wherein density and/or optical power of an optical element of the plurality of optical elements is based at least on the prescribed refractive power Px and the functional asymmetries over the visual field of the eye of the wearer.

3. The lens element according to claim 1, wherein the optical elements are organized in a plurality of concentric rings centered on the central zone.

4. The lens element according to claim 1, wherein the optical elements are organized in a plurality of radial segments centered on the central zone.

5. The lens element according to claim 1, wherein the optical elements are contiguous.

6. The lens element according to claim 1, wherein at least one of the optical elements are non-spherical microlenses.

7. The lens element according to claim 1, wherein at least one of the optical elements are diffractive microlenses.

8. The lens element according to claim 7, wherein the diffractive microlenses are Pi-Fresnel microlenses.

9. The lens element according to claim 1, wherein the optical elements have a contour shape being inscribable in a circle having a diameter greater than or equal to 0.2 mm and smaller than or equal to 2.0 mm.

10. The lens element according to claim 1, wherein the refractive area is formed as the area other than the areas formed as the plurality of optical elements.

11. The lens element according to claim 1, wherein at least part of the optical elements are located on the front surface of the lens element.

12. The lens element according to claim 1, wherein the optical elements have a contour shape being inscribable in a circle having a diameter greater than or equal to 0.4 mm and smaller than or equal to 2.0 mm.

13. The lens element according to claim 1, wherein the optical elements have a contour shape being inscribable in a circle having a diameter greater than or equal to 0.6 mm and smaller than or equal to 2.0 mm.

14. The lens element according to claim 1, wherein the optical elements have a contour shape being inscribable in a circle having a diameter greater than or equal to 0.2 mm and smaller than or equal to 1.0 mm.

15. A method for determining a lens element, the lens element including: a refraction area having a refractive power based on a prescribed refractive power Px for an eye of a wearer and comprising at least a central zone, and a plurality of optical elements having an optical function of not focusing an image on a retina of the eye of the wearer, the method comprising:

- obtaining wearer's data, the wearer's data comprising at least prescription data relating to the prescribed refractive power Px;
- obtaining asymmetries data, the asymmetries data relating to the wearer's functional asymmetries over a visual field; and
- optimizing at least one parameter of the optical elements based on the wearer's data and asymmetries data,
- wherein the lens element is adapted to the wearer and intended to be worn in front of the eye of the wearer, the lens element including
- the refraction area having the refractive power based on the prescribed refractive power Px for said eye of the wearer and comprising at least the central zone, and
- the plurality of optical elements having the optical function of not focusing the image on the retina of the eye of the wearer,
- wherein the optical elements are organized based at least on the prescribed refractive power Px and functional asymmetries over the visual field of the wearer, and
- wherein the lens element is divided in five complementary zones, the central zone and four quadrants at 45° and at least one of density of optical elements is lower in the lower and left quadrants than in the higher and right quadrant or optical power of the optical elements is higher in the lower and left quadrants than in the higher and right quadrant.

16. The method according to claim 15, wherein optimizing at least one parameter of the optical elements comprises determining density and/or optical power of the optical elements.

17. The method according to claim 16, wherein optimizing at least one parameter of the optical elements comprises determining the density and/or optical power of the optical elements in the lower and right quadrants of the optical elements.

18. The method according to claim 15, further comprising obtaining sensitivity data relating at least to visual sensitivity of the wearer throughout the whole vision field, and wherein the at least one parameter of the optical elements is optimized considering said sensitivity data.

19. A lens element adapted to a wearer and intended to be worn in front of an eye of the wearer, the lens element comprising:

a refraction area having a refractive power based on a prescribed refractive power Px for said eye of the wearer and comprising at least a central zone; and a plurality of optical elements having an optical function of not focusing an image on a retina of the eye of the wearer, wherein the optical elements are organized based at least on the prescribed refractive power Px and functional asymmetries over a visual field of the wearer, and wherein the optical elements are diffractive Pi-Fresnel microlenses.

* * * * *